Patented Oct. 23, 1934

1,977,698

UNITED STATES PATENT OFFICE 1,977,698

CERAMIC MATERIAL AND METHOD OF MAKING THE SAME

Walter J. Scott, Brookfield, Ill., assignor to Western Electric Company, Incorporated, New York, N. Y., a corporation of New York No Drawing. Application April 28, 1933, Serial No. 668,387

13 Claims. (Cl. 25—156)

This invention relates to ceramic materials and methods of making the same and has for its objects the provision of ceramic materials, which may be readily molded, and the provision of simple, expeditious and effective methods of making ceramic materials and articles.

In accordance with one embodiment of the invention, ceramic substances, such as talc and clay, are mixed with a temporary binding agent, such as a paraffin emulsion in water, to provide a uniform dispersion of the paraffin, after which the water is either evaporated or removed with a filter press. The dry mixture of talc, clay and paraffin is then disintegrated and sieved to remove some of the fine particles, leaving a granular mixture which is molded to the desired form and the molded part is heat treated at approximately 2200° F. to drive off the paraffin and bake the ceramic composition.

In practicing one method embodying the invention, about 75 parts of talc and 25 parts of a suitable clay, such as kaolin, are mixed with an organic temporary binding agent dispersed in a suitable liquid to form an emulsion or colloidal suspension. A suitable emulsion for this purpose comprises about 88 parts by weight of paraffin, 9 parts of stearic acid, 3 parts of triethanolamine and 300 parts of water. The water, triethanolamine and stearic acid are mixed and heated to 212° F., allowing the mixture to boil gently. The mixture is then carefully stirred so that a smooth soap solution is obtained with a minimum of foam. The paraffin is melted in a separate container and brought to a temperature of about 194° F. The molten paraffin is then added immediately to the boiling soap solution and stirred vigorously until the paraffin is evenly dispersed. The emulsion is then stirred slowly while cooling. The purpose of emulsifying the paraffin in the water is to obtain a thorough dispersion of the paraffin so that when it is mixed with the kaolin and talc, the paraffin will be uniformly distributed over the particles of these materials.

Instead of paraffin, carnauba wax, beeswax, cerowax or similar materials may be used. The stearic acid may also be replaced by other organic soap forming acids, such as oleic acid. It is also possible to use resins as a temporary organic binding agent. However, in forming an emulsion from resins, it is frequently desirable to pass the emulsion through a colloid mill in order to improve the degree of dispersion and render the emulsion more stable.

The emulsion is thoroughly mixed throughout the mixture of talc and kaolin and the resulting mixture is passed through a filter press to remove the major portion of the water therefrom and the remaining water is evaporated or all of the water may be removed by evaporation. The dry mixture of talc, kaolin and paraffin is then disintegrated and the disintegrated material is screened to remove some of the fine particles to facilitate molding.

The granular material produced by the above outlined steps is a very satisfactory molding composition from which ceramic articles may be produced. One satisfactory method of employing the molding composition is to press a quantity of the material into the desired form in a cold mold by means of a hydraulic press or other suitable apparatus, to trim the molded part, if necessary, to remove projecting fins, and to heat the molded part at a high temperature (about 2200°), to remove the paraffin and to harden the ceramic composition.

It is difficult or practically impossible to press a dry mixture of talc and kaolin into a desired form and when parts molded from these or similar materials are held together during the molding operation by a liquid binding agent, such as water, the resulting parts have a great tendency to shrink and warp when the molded parts are dried. The dry, temporary binding agent, which is removed when the molded part is subjected to a high temperature, is employed to hold the talc and kaolin in the desired form during the molding and handling operations. Paraffin has proven to be a very satisfactory material to use for this purpose but other related materials, such as referred to above, may be used with satisfactory results.

Because of the high mechanical strength, high dielectric strength, high insulating resistance at both low and high temperatures, the permanence of the size, shape and electrical properties, and freedom from alteration by atmospheric conditions of ceramic materials produced by the above described method, articles made from the molding composition described hereinbefore give results which are equal to or better than similar articles known to the art and have the additional advantage that they may be cheaply and easily made in the desired shape and size within very close limits.

It is, of course, to be understood that the embodiments of the invention described above are merely useful forms of the invention, which illustrate how the invention may be practiced and the scope of the invention is not limited thereby, but the invention is limited only by the scope of the annexed claims.

What is claimed is:

1. A method of making a ceramic molding composition, which comprises mixing ceramic substances with a colloidal suspension of paraffin in water, and removing the water to form a moldable composition.

2. A method of making a ceramic molding composition, which comprises mixing talc and clay with a colloidal suspension of paraffin in water, and removing the water to form a moldable composition.

3. A method of making a ceramic article, which comprises mixing ceramic substances with a colloidal suspension of paraffin in water, removing the water, molding the resulting mass into the desired form, and heating the molded mass to a temperature sufficiently high to remove the paraffin and harden the remaining substances.

4. A method of making a ceramic article, which comprises mixing ceramic substances with an organic binding agent dispersed in a liquid medium, removing the suspending medium, molding the resulting mass into the desired form, and heating the molded mass to a temperature sufficiently high to remove the organic binding agent and harden the remaining substances.

5. A method of making a ceramic article, which comprises mixing ceramic substances with an organic binding agent suspended in water, removing the water, molding the resulting mass into the desired form, and heating the molded mass to a temperature sufficiently high to remove the organic binding agent and harden the remaining substances.

6. A method of making a ceramic molding composition, which comprises mixing ceramic substances with an organic binder suspended in a liquid suspending medium, and removing the suspending medium to form a moldable composition.

7. A method of making a ceramic molding composition, which comprises forming an aqueous organic soap solution, mixing an organic binding agent therewith to form an emulsion, mixing ceramic substances with the emulsion, and removing the water therefrom to form a moldable composition.

8. A method of making a ceramic molding composition, which comprises forming a solution of triethanolamine, an organic acid and water, adding an organic acid and water, adding an organic binding agent thereto, mixing the resulting emulsion with ceramic substances, and removing the water therefrom to form a moldable composition.

9. A method of making a ceramic molding composition, which comprises forming a solution of triethanolamine, stearic acid and water, adding paraffin to the solution to form an emulsion, mixing ceramic substances with the emulsion, and removing the water from the resulting mass to form a moldable composition.

10. A method of making a ceramic molding composition, which comprises forming a solution of triethanolamine, stearic acid and water, adding paraffin to the solution to form an emulsion, mixing ceramic substances with the emulsion, removing the water from the resulting mass to form a moldable composition, forming the composition in a mold, and baking the molded composition to form an article.

11. A ceramic molding composition comprising ceramic materials and an aqueously dispersed temporary binding agent.

12. A ceramic molding composition comprising ceramic materials and paraffin dispersed therethrough in a water emulsion.

13. A ceramic molding composition comprising ceramic materials mixed with an emulsion of paraffin in a water solution of stearic acid and triethanolamine.

WALTER J. SCOTT.